United States Patent [19]

Wedding

[11] 4,118,214

[45] Oct. 3, 1978

[54] TREATING POLYCHROMATIC GLASS IN REDUCING ATMOSPHERES

[75] Inventor: Brent M. Wedding, Corning, N.Y.

[73] Assignee: Corning Glass Works, Corning, N.Y.

[21] Appl. No.: 808,863

[22] Filed: Jun. 22, 1977

[51] Int. Cl.² .................. C03C 15/00; C03B 32/00; C03C 3/04

[52] U.S. Cl. .................. 65/30 R; 65/32; 65/33; 65/DIG. 2; 106/52; 106/DIG. 6

[58] Field of Search .......... 65/32, DIG. 2, 30 R, 65/33; 106/52, DIG. 6

[56] References Cited

U.S. PATENT DOCUMENTS

| | | | |
|---|---|---|---|
| 2,649,387 | 8/1953 | Parson et al. | 63/32 X |
| 3,663,193 | 5/1972 | Wilson | 65/30 R |
| 3,892,582 | 7/1975 | Simms | 65/32 |
| 3,892,904 | 7/1975 | Tanaka | 65/30 R |
| 3,920,463 | 11/1973 | Simms | 65/32 X |
| 3,967,040 | 6/1976 | Plumat et al. | 65/32 X |
| 4,030,903 | 6/1977 | Rittler | 65/32 |

*Primary Examiner*—S. Leon Bashore
*Assistant Examiner*—Frank W. Miga
*Attorney, Agent, or Firm*—Clinton S. Janes, Jr.; Clarence R. Patty, Jr.

[57] ABSTRACT

The present invention primarily comprises an improvement upon the method for producing photosensitive colored glasses or polychromatic glasses utilizing two sequences of exposure to high energy or actinic radiation followed by heat treatment. The invention contemplates replacing the second exposure/heat treatment step with a heat treatment conducted in a reducing atmosphere at a temperature of at least 350° C., but below the strain point of the glass. The resultant articles can be particularly useful in ophthalmic applications.

21 Claims, No Drawings

TREATING POLYCHROMATIC GLASS IN REDUCING ATMOSPHERES

BACKGROUND OF THE INVENTION

U.S. Pat. No. 4,017,318 discloses two basic methods for preparing photosensitive colored glasses or polychromatic glasses, as they have more recently been termed, each method being founded in a sequence of irradiation and heat treating steps. The glasses described in that patent evidence a wide variation in base compositions but each requires the presence of silver, an alkali metal oxide which is preferably Na$_2$O, fluoride, and at least one other halide selected from the group of chloride, bromide, and iodide. The glasses are subjected to high energy or actinic radiations selected from the group of high velocity electrons, X-radiations, and ultra-violet radiations in the range of about 2800Å–3500Å. The heat treatments comprehend exposures to temperatures between about the transformation range of the glass up to about the softening point thereof. Where ultra-violet radiation constitutes the effective actinic radiation, CeO$_2$ is recited as being a necessary constituent of the glass composition.

In the first of the two methods described, the glass is initially irradiated with high energy or actinic radiations to cause the development of a latent image in the glass. The duration of this exposure and the flux thereof, i.e., the energy/unit area of the irradiation, determine the final color which will be exhibited by the glass. Thereafter, the glass is exposed to a heat treatment at a temperature between about the transformation range and the softening point of the glass to effect the precipitation in situ of colloidal silver particles which act as nuclei.

Where a transparent colored glass is desired, this heat treatment will be conducted only for so long as to cause the precipitation of colloidal silver nuclei with the possible growth thereon of extremely small microcrystals of alkali metal fluoride-silver halide, e.g., NaF + (AgCl and/or AgBr and/or AgI). Where an opal glass is to be produced, the heat treatment will be prolonged for a sufficient length of time and at a sufficiently high temperature not only to promote the precipitation in situ of colloidal silver nuclei, but also to cause the growth of said microcrystals on the silver nuclei to a great enough size to scatter light.

Subsequently, the nucleated glass is cooled, customarily to room temperature but, in any event, to a temperature at least 25° C. below the strain point of the glass, and re-exposed to high energy or actinic radiation. This second exposure process acts to develop the color, the hue of which was determined by the previous exposure. Finally, the glass is again heated to a temperature between about the transformation range and the softening point of the glass to bring out the desired color therein.

Whereas the mechanism of color production was not fully understood, it was believed that the quantity of silver precipitated and the geometry of the precipitated particles, as well as perhaps the refractive index of any crystals developed, decide the color exhibited. Nevertheless, because the colors can be attained with very minor amounts of silver, it was postulated that at least one of the following situations obtained: (1) the presence of discrete colloidal particles of silver less than about 200Å in the smallest dimension; (2) metallic silver was deposited within alkali fluoride-silver halide microcrystals, the silver-containing portion of the microcrystals being less than about 200Å in the smallest dimension; and (3) metallic silver was deposited upon the surface of the microcrystals, the silver-coated portion of the microcrystals being less than about 200Å in the smallest dimension. The microcrystals are present in a concentration of at least about 0.005% by volume.

The patent noted that the use of consecutive or interrupted heat treatments, either after the initial irradiation to high energy or actinic radiation or after the second irradiation step, can be useful in intensifying the final color produced. Consequently, although the reaction mechanism underlying that phenomenon is not completely comprehended, experience indicated that two or more heat treatments at temperatures between the transformation range and the softening point of the glass do not alter the color developed, but can promote a more vivid color than a single heat treatment of equal or longer duration.

The patent also observed that the identity of the color developed in the glass was depended upon the duration and flux of the initial exposure to high energy or actinic radiation. Thus, the least exposure yielded a green coloration followed by blue, violet, red, orange, and yellow as the exposure time and/or flux was increased.

The second general method for preparing photosensitive colored glass disclosed in U.S. Pat. No. 4,017,318, supra, involves the production of glass articles exhibiting a single color, but which color can be varied over the full range of the visible spectrum. Such glasses were formed from compositions wherein the silver content was partially thermoreduced in a heat treating step at temperatures between the transformation range and the softening point of the glass without a previous irradiation by high energy or actinic radiation. This heat treatment can conveniently be conducted during the customary annealing of the initially formed article. Subsequently, the so-conditioned or presensitized glass is subjected to high energy or actinic radiation followed by heat treatment at temperatures between the transformation range and the softening point of the glass.

The monochrome color produced is dependent upon the concentrations of silver and the thermoreducing agent included in the glass composition. SnO is stated to be the preferred agent for that purpose. The color displayed by the glass progressively changed from green through blue, violet, red, orange, and yellow with increased amounts of thermoreducing agent where the silver concentration is held constant.

As is evident, this latter method eliminates the need for the first exposure to high energy or actinic radiation but has the disadvantage of permitting the development of only one color in a given article of glass, since the initial thermal reduction determines the final color to be produced. The subsequent exposure and heat treatment merely bring out that color.

United States application Ser. No. 778,160, filed Mar. 16, 1977 by Joseph Ference, describes an improvement upon the method for producing polychromatic glasses disclosed in U.S. Pat. No. 4,017,318, supra, wherein the time required for developing the color is shortened and the colors, themselves, are often more vivid.

The preferred embodiment of the invention contemplates four basic steps:

(1) a glass article is formed having a composition coming within the ranges set out in U.S. Pat. No. 4,017,318;

(2) the glass article is exposed to high energy or actinic radiation for a sufficient length of time to develop a latent image therein;

(3) the high energy or actinic radiation is removed and the glass article heated to a temperature between the transformation range and the softening point of the glass for a sufficient length of time to cause nucleation and growth of microcrystals consisting of alkali fluoride containing at least one silver halide selected from the group of AgCl, AgBr, and AgI; and then (4) the glass article is re-exposed to high energy or actinic radiation while at a temperature between about 200°–410° C. for a sufficient length of time to cause metallic silver to be deposited as discrete colloidal particles less than about 200Å in the smallest dimension, and/or deposited on the surface of said microcrystals, the portion of the microcrystal coated with silver being less than about 200Å in the smallest dimension, and/or deposited within said microcrystals, the silver-containing part of the microcrystal being less than about 200Å in the smallest dimension, said microcrystals having a concentration of at least 0.005% by volume.

Where desired, the initial irradiation by high energy or actinic radiation may also be undertaken at temperatures between about 200°–410° C. That practice is optional, however, since it does not appear to improve significantly the intensity of the final color developed within the glass, although it does have the advantage of reducing the time required for nucleation and incipient crystallization. Moreover, should this initial irradiation of the glass at elevated temperatures be prolonged for an extended period of time, the glass will take on a permanent yellowish cast. Such a phenomenon is, of course, unwanted where a spectrum of colors is desired.

In summary, both U.S. Pat. No. 4,017,318 and U.S. application Ser. No. 778,160 teach that, where the development of a variety of colors is desired in polychromatic glasses, two exposures to high energy or actinic radiation are demanded. In actual practice, the first irradiation treatment is commonly of relatively short duration, e.g., a few minutes will frequently be sufficient, whereas the second exposure is of much longer duration, i.e., typically one hour or longer even when combined with the second heat treatment as disclosed in U.S. application Ser. No. 778,160. It can readily be appreciated that the energy required for the exposure step, i.e., the energy required for the high intensity radiation for an extended period of time, adds a very substantial factor to the cost of the finished article. Furthermore, the need for irradiation places constraints on the sizes of articles that can be so-treated and the overall speed of production.

Accordingly, it would be highly desirable if polychromatic glass articles could be produced exhibiting a variety of colors of high intensity without the requirement of a lengthy irradiation step.

SUMMARY OF THE INVENTION

The general features required for the production of the operative color centers in polychromatic glasses are reasonably well understood. Thus, as is explained in U.S. Pat. No. 4,017,318, the first irradiation and heat treatment give rise to the development of silver particles which act as nuclei for the growth of microcrystals of alkali fluoride plus AgCl and/or AgBr and/or AgI. As can be seen in the transmission electron micrographs appended to that patent, the crystals exhibit an acicular or pyramidal morphology having silver concentrated at the tip thereof. During the second exposure plus heat treatment, this silver is reduced thereby yielding elongated metallic particles which absorb light at wavelengths determined by the length: width aspect ratio of the particles and the polarization of the incident light.

Laboratory study has demonstrated that the wavelength sensitivity for both the first and the second irradiation steps is identical where ultra-violet radiations constitute the actinic radiation, and that the maximum sensitivity corresponds to the maximum of the $Ce^{+3}$ absorption which peaks near 3000Å. This circumstance necessarily leads to the conclusion that the mechanics of both exposures is founded in the production of photoelectrons which function as reducing agents for the silver.

The first exposure to high energy or actinic radiation is inherently quite efficient because the silver is relatively uniformly dispersed within the glass as are, it is postulated, the photoelectrons. During the second exposure, there is again produced a homogeneous cloud of photoelectrons, but these must now locate the highly localized silver-containing sites produced during the first exposure. This circumstance, resulting in long reaction paths, is believed to constitute the reason for the lengthy second exposure.

The present invention is founded in the discovery that the second irradiation with high energy or actinic radiation can be eliminated and colors equivalent in variety and intensity secured where the nucleated glass is fired in a reducing atmosphere; one that preferably consists of a hydrogen gas-containing environment. A temperature of at least 350° C., but not greater than about the strain point of the glass, is required. At temperatures much above the strain point, the color centers become altered.

The instant invention is operable with the glasses illustratively disclosed in U.S. Pat. No. 4,017,318. Those glasses consist essentially, in weight percent on the oxide basis, of about 10–20% $Na_2O$, 0.0005–0.3% Ag, 1–4% F, an amount of at least one halide selected from the group consisting of Cl, Br, and I at least sufficient to react stoichiometrically with the Ag, but not more than a total of about 4%, and the remainder $SiO_2$. Where ultra-violet radiation having wavelengths between about 2800Å–3500Å constitutes the actinic radiation, about 0.01–0.2% $CeO_2$ will be incorporated into the composition. Furthermore, where $Sb_2O_3$ and/or SnO are employed as thermoreducing agents, about 0.1–1% $Sb_2O_3$ and/or about 0.01–1% SnO will be included, the total $Sb_2O_3$ + SnO not exceeding about 1%.

In the production of monochrome bodies, Ag will be present in an amount of at least 0.002%, SnO in at least 0.02%, and fluoride will preferably not exceed about 2%.

Also, in like manner to that patent, the concentration of the microcrystals in the colored transparent glasses will not exceed about 0.1% by volume and the size thereof will not exceed about 0.1 micron in diameter. Customarily, where transparent articles are desired, the silver content will be maintained below about 0.1% by weight, the fluoride concentration will be held below about 3% by weight, and the total of the remaining halides will not exceed about 2% by weight. The addition of up to 18% by weight ZnO and up to 10% by weight $Al_2O_3$ can be very useful in improving chemical durability, melting and forming capabilities, and other physical properties of the base glass. Those additions provide the preferred glass compositions of the invention.

An atmosphere of hydrogen constitutes the most effective reducing atmosphere from the standpoint of speed in operation. Other reducing environments less hazardous than hydrogen alone are well known to the art, however, e.g., forming gas (a mixture of $N_2$ and $H_2$ gases), cracked ammonia, and mixtures of CO and $CO_2$. Numbers of forming gases are commercially marketed, e.g., 92% $N_2$, 8% $H_2$, 90% $N_2$, 10% $H_2$, and 80% $N_2$, 20% $H_2$, any of which will be operable.

DESCRIPTION OF PREFERRED EMBODIMENTS

The following table reports compositions, expressed in parts by weight on the oxide basis as calculated from the batch, of glasses operable in the instant invention. Because it is not known with which cation(s) the halides are combined, they are merely listed as halide, in accordance with conventional glass analysis practice. Furthermore, inasmuch as the contents of silver are very low, they are simply tabulated in terms of Ag. Finally, since the sum of the individual components closely approximates 100, for all practical purposes each constituent may be deemed to be included in weight percent.

The actual batch ingredients other than the halides can comprise any material, either the oxide or other compound, which, when melted together with the remaining batch, will be converted into the desired oxide in the proper proportions. The halides are commonly added as alkali metal halides. Where $Sn^{+2}$ is utilized as a thermoreducing agent, it is frequently incorporated in the batch in the form of a halide.

Up to as much as 50% by weight of the halide constituents and up to as much as 30% by weight Ag may be lost via volatilization during the batch melting step. The addition of extra quantities of those components to compensate for such losses, however, is well within the technical ingenuity of the glass technologist.

Although the exemplary compositions in the following table involved laboratory scale melting experiments, it will be appreciated that large-scale commercial melts utilizing pots or continuous glass melting tanks can be undertaken with compositions of the subject invention. The compositions recited below were compounded, the ingredients ballmilled together to assist in achieving a homogeneous melt, and thereafter melted in a furnace operating at about 1450° C. for about 4 to 6 hours with stirring. The melts were cast into steel molds to yield glass blocks of various sizes and configurations, and discs about 3 inches in diameter and 0.125 inch thick were pressed. The glass articles were immediately transferred to annealers operating at about 375°–450° C.

TABLE

| | 1 | 2 | 3 | 4 |
|---|---|---|---|---|
| $SiO_2$ | 72.0 | 72.0 | 72.0 | 72.0 |
| $Na_2O$ | 16.2 | 16.2 | 16.2 | 16.2 |
| ZnO | 5.0 | 5.0 | 5.0 | 5.0 |
| $Al_2O_3$ | 6.9 | 6.8 | 6.8 | 6.8 |
| F | 2.5 | 2.8 | 2.8 | 2.8 |
| $CeO_2$ | 0.05 | 0.1 | 0.1 | 0.1 |
| Br | 1.1 | 0.2 | 0.4 | 0.4 |
| $Sb_2O_3$ | 0.2 | 0.5 | 0.5 | 0.3 |
| Ag | 0.01 | 0.03 | 0.03 | 0.03 |
| SnO | 0.05 | 0.12 | 0.12 | 0.09 |

In the following illustrative examples, a 2500 watt mercury vapor lamp system having substantial intensity at a wavelength of about 3000A provided the source of actinic radiation. Other sources of ultra-violet radiation can obviously be utilized and, as has been pointed out above, high energy electrons and X-radiations are also effective in securing the necessary photoreduction of silver ions.

EXAMPLE 1

A pressed disc was prepared from each composition recited in the above table and samples thereof about 1 × 0.5 inch × 1.5 mm were ground and polished. Strips of masking tape opaque to ultra-violet radiations were placed over sections of each sample running in the same direction. The strips were so positioned as to divide the top surface area of the samples into three approximately equal longitudinal portions.

The samples were then exposed at ambient temperature to the ultra-violet lamp in the focal plane of the system. The tapes were successively removed to form horizontal areas of glass exposed for periods of 30, 60, and 105 seconds, respectively. The exposed samples were thereafter transferred to an electrically fired furnace, heated at about 10° C./minute to 510° C., held at that temperature for about 1 hour, and then cooled to room temperature.

The samples were transferred to an electrically fired furnace tube through which hydrogen gas was passed at a flow rate of about 0.3 l/min. After purging the tube with the hydrogen gas, the glass samples were subjected to about 5 minutes treatment at a temperature of about 475° C. A slight coloration could be discerned in each. Further treatment to 15 minutes resulted in definite coloration in each sample with progressively longer exposures yielding even more intense colors.

The strip portions of the samples exhibited the following colors, based upon the length of the initial exposure to ultra-violet light:

30 seconds — blue-green
60 seconds — blue
105 seconds — reddish

EXAMPLE 2

A pressed disc having composition 1 from the above table was cut into samples about 1 × 0.5 inch × 1.5 mm. which were ground and polished. Strips of masking tape were placed over sections thereof in like manner to that described in Example 1. Also in accord with Example 1, sections of the samples were exposed to ultra-violet radiation for periods of 30 seconds, 60 seconds, and 105 seconds, respectively, heated at about 10° C./minute to 510° C., and held at that temperature for about 1 hour.

The samples were then treated in a forming gas (92% $N_2$, 8% $H_2$) atmosphere at about 450° C. with a gas flow of about 0.3 l/min. Definite coloration was observed after 8 hours and more pronounced tints were achieved only after about 15 hours exposure. The strips displayed colors similar in hue to those of Example 1. It will be appreciated that the use of a forming gas containing a greater proportion of hydrogen gas will result in a faster rate of color development.

As is well recognized in the art, the rate of hydrogen permeation into glass is influenced both by temperature and the pressure of the hydrogen-containing atmosphere. Hence, the diffusion rate is increased when the temperature of contact with the reducing atmosphere is elevated and/or the pressure thereof is raised. Thus, as the pressure of a hydrogen-containing environment is raised above ambient pressure, the rate of color production will be increased. Also, the use of a wet reducing gas, e.g., forming gas that has been passed through liquid water or otherwise combined with water vapor, can sometimes be more effective than gas in the dry state.

Yet, the treatment temperature must not be so high and/or the treatment carried out for so long a period that the color centers become thermally altered. For example, treatment of composition 1 in hydrogen gas at a temperature of about 510° C. (approximately the strain point of the glass) resulted in a totally yellow article, thereby indicating thermal destruction of the color centers. Likewise, where composition 1 was subjected to forming gas at about 470° C. for about 16 hours, a totally yellow body was produced. Finally, the severity of the reducing environment also plays an important role, as is illustrated via a comparison of Examples 1 and 2. Thus, the pure hydrogen gas atmosphere in Example 1 was very effective at 450° C., whereas the forming gas required much longer exposure periods to yield similar results. Finally, glass composition also appears to have an effect upon the rate of the thermoreduction reaction. For example, a glass more permeable to the diffusion of hydrogen will increase the reaction rate. In this connection, it has been demonstrated that increasing the $Na_2O$ content of a glass decreases the hydrogen permeation rate substantially.

In sum, the optimum temperature for the thermoreducing treatment will desirably be as high as possible to maximize hydrogen diffusion into the glass, but below about the strain point of the glass. Therefore, where pure hydrogen gas is employed, treatment temperatures between about 425°–475° C. are preferred. A temperature of about 500° C. is believed to be a practical maximum to permit ready control of color production. At temperatures much below about 350° C., the rate of color production, even with pure hydrogen gas at elevated pressures, becomes so slow as to be relatively impractical.

The present invention is also operable where the development of monochrome colors is desired. Thus, for example, a glass containing a thermoreducing agent, such as composition 1 of the above table, can be cooled slowly enough from the melt or reheated to a temperature between the transformation range and softening point of the glass to cause partial thermoreduction of the silver. Thereafter, exposure of the glass to a gaseous reducing atmosphere at a temperature between about 350° C. and the strain point of the glass will cause the production of color therewithin.

This method permits the development of color within a glass without the need for any irradiation to high energy or actinic radiation, but, of course, only a single color can be produced.

I claim:

1. A method for making a polychromatic glass article wherein at least a portion thereof is integrally colored by silver which consists of the steps:
    (a) melting a batch for a glass containing the constituents of alkali fluoride, the constituents of at least one silver halide selected from the group consisting of AgCl, AgBr, and AgI, and 0–0.2% $CeO_2$;
    (b) forming said melt into a glass article;
    (c) exposing at least a portion of said article to high energy or actinic radiation selected from the group consisting of high velocity electrons, X-radiations, and ultra-violet radiations to develop a transparent latent image;
    (d) heating at least said exposed portion of said article to a temperature between about the transformation range of the glass and the softening point thereof for a sufficient length of time to cause nucleation and growth of microcrystals of alkali fluoride containing at least one silver halide selected from the group consisting of AgCl, AgBr, and AgI;
    (e) subjecting at least said exposed portion of said article to a gaseous reducing atmosphere at a temperature of at least 350° C., but less than about the strain point of the glass, for a sufficient length of time to cause metallic silver to be deposited as discrete colloidal particles less than 200Å in the smallest dimension, and/or deposited within said microcrystals, the silver-containing part of the microcrystal being less than about 200Å in the smallest dimension, and/or deposited upon the surface of said microcrystals, the portion of the microcrystal coated with silver being less than about 200Å in the smallest dimension, said microcrystals having a concentration of at least 0.005% by volume, whereby color is produced in said exposed portion of said article; and then
    (f) cooling said article to ambient temperature.

2. A method according to claim 1 wherein said glass consists essentially, in weight percent on the oxide basis, of about 10–20% $Na_2O$, 0.0005–0.3% Ag, 1–4% F, an amount of at least one halide selected from the group consisting of Cl, Br, and I at least sufficient to react stoichiometrically with the Ag, but not more than a total of about 3%, and the remainder $SiO_2$.

3. A method according to claim 1 wherein said glass contains about 0.01–0.2% $CeO_2$.

4. A method according to claim 2 wherein said glass also contains up to 18% ZnO and/or up to 10% $Al_2O_3$.

5. A method according to claim 1 wherein said integrally colored portion of said glass article exhibits transparency and the concentration of said microcrystals does not exceed about 0.1% by volume and the size thereof does not exceed about 0.1 micron in diameter.

6. A method according to claim 1 wherein said gaseous reducing atmosphere is selected from the group consisting of a hydrogen-containing gas, cracked ammonia, and mixtures of CO and $CO_2$.

7. A method according to claim 6 wherein said hydrogen-containing gas is selected from the group consisting of hydrogen and forming gas.

8. A method according to claim 6 wherein said gaseous reducing atmosphere is at a pressure greater than ambient pressure.

9. A method according to claim 6 wherein said gaseous reducing atmosphere is wet.

10. A method according to claim 1 wherein at least said portion of said article is subjected to a gaseous reducing atmosphere at a temperature between about 425°–475° C.

11. A method for making a monochromatic glass article wherein at least a portion thereof is integrally colored by silver which consists of the steps:
    (a) melting a batch for a glass containing the constituents of alkali fluoride, the constituents of at least one silver halide selected from the group consisting of AgCl, AgBr, and AgI, a thermoreducing agent, and 0–0.2% $CeO_2$;
    (b) forming said melt into a glass article;

(c) heating at least a portion of said article to a temperature between about the transformation range of the glass and the softening point thereof for a sufficient length of time to cause nucleation and growth of microcrystals of alkali fluoride containing at least one silver halide selected from the group consisting of AgCl, AgBr, and AgI;

(d) subjecting at least said heated portion of said article to a gaseous reducing atmosphere at a temperature of at least 350° C., but less than about the strain point of the glass, for a sufficient length of time to cause metallic silver to be deposited as discrete colloidal particles less than 200Å in the smallest dimension, and/or deposited within said microcrystals, the silver-containing part of the microcrystal being less than about 200Å in the smallest dimension, and/or deposited upon the surface of said microcrystals, the portion of the microcrystal coated with silver being less than about 200Å in the smallest dimension, said microcrystals having a concentration of at least 0.005% by volume, whereby a single color is produced in said heated portion of said article; and then (e) cooling said article to ambient temperature.

12. A method according to claim 11 wherein said glass contains about 0.01–0.2% $CeO_2$.

13. A method according to claim 11 wherein said thermoreducing agent is SnO.

14. A method according to claim 11 wherein said glass consists essentially, in weight percent on the oxide basis, of about 10–20% $Na_2O$, 0.002–0.3% Ag, 1–2% F, an amount of at least one halide selected from the group consisting of Cl, Br, and I at least sufficient to react stoichiometrically with the Ag, but not more than a total of about 3%, 0.02–1% SnO, and the remainder $SiO_2$.

15. A method according to claim 14 wherein said glass also contains up to 18% ZnO and/or up to 10% $Al_2O_3$.

16. A method according to claim 11 wherein said integrally colored portion of said glass article exhibits transparency and the concentration of said microcrystals does not exceed about 0.1% by volume and the size thereof does not exceed about 0.1 micron in diameter.

17. A method according to claim 11 wherein said gaseous reducing atmosphere is selected from the group consisting of a hydrogen-containing gas, cracked ammonia, and mixtures of CO and $CO_2$.

18. A method according to claim 17 wherein said hydrogen-containing gas is selected from the group consisting of hydrogen and forming gas.

19. A method according to claim 17 wherein said gaseous reducing atmosphere is at a pressure greater than atmospheric pressure.

20. A method according to claim 17 wherein said gaseous reducing atmosphere is wet.

21. A method according to claim 11 wherein at least said portion of said article is subjected to a gaseous reducing atmosphere at a temperature between about 425°–475° C.

* * * * *